UNITED STATES PATENT OFFICE.

FELIX KUNERT, OF OFFENBACH-ON-THE-MAIN, GERMANY, ASSIGNOR TO THE CORPORATION OF CHEMISCHE FABRIK GRIESHEIM-ELEKTRON, OF FRANKFORT-ON-THE-MAIN, GERMANY.

COMPOUNDS FOR USE IN THE PRODUCTION OF DYESTUFFS.

1,193,566.  Specification of Letters Patent.  Patented Aug. 8, 1916.

No Drawing.  Application filed April 23, 1915.  Serial No. 23,360.

*To all whom it may concern:*

Be it known that I, FELIX KUNERT, citizen of the German Empire, and resident of Offenbach-on-the-Main, in the Grand Duchy of Hesse, Germany, (with the post-office address Tenefelderstrasse No. 77,) have invented new and useful Improvements in Compounds for Use in the Production of Dyestuffs, of which the following is a specification.

My invention relates to new compounds for use in the production of dyestuffs.

I have found that concentrated mixtures of nitrosamin-alkali-metal-salts and alkali salts of 2.3-oxynaphthoic-acid-arylamids, form compounds which possess an excellent stability lasting for months and years. Such compounds can be produced not only in form of paste but even in solid form.

United States Letters Patent No. 1127027 describes a process of producing dyestuffs on the fiber by means of the alkali salts of nitrosamins and 2.3-oxynaphthoic-acid-arylamids by means of the one-bath method. This process is based upon the recognition of the fact that the printing pastes consisting of a nitrosamin-alkali-salt, an alkali salt of a 2.3-oxynaphthoic-acid-arylid and a thickening substance possess an excellent stability, sufficient for easy use. The properties of the new compounds according to the above mentioned Letters Patent could not be foreseen because in that process an essential influence on the stability must also be given to the thickening substance. After diluting with water or thickening substances the new compounds can be used as well as freshly prepared mixtures of nitrosamins and 2.3-oxynaphthoic-acid-arylamid-alkali-salts. These compounds possess a great technical interest because they make it possible to supply the consumer with a product in the most concentrated form which yields, very readily that is by dissolving in water, solutions or printing colors, which can be directly used for producing dyestuffs, and the use of these compounds results in a considerable saving of time.

There are taken into consideration the mixtures from nitrosamin-alkali-metal-salts, which can be obtained from para-nitranilin, nitro-ortho-anisidin, meta-nitro-para-toluidin and other bases capable of being diazotized, with the alkali metal salts of the 2.3-oxynaphthoic-acid-arylamids. The stability of these mixtures is so great that they can be dried and ground to a fine powder and therefore can be marketed in the most concentrated form. This is important in view of the fact that diluted solutions of nitrosamin-alkali-metal-salts and beta-naphthol-alkali-metal-salts have a very small stability.

The new compounds are suitable for use in various industries. Thus they may be advantageously used for printing and for producing fast colors on cotton.

The production of the new compounds may be illustrated by the following examples:

Example I: 15 kg. 2.3-oxynaphthoic-acid-anilid are well ground with 22.5 kg. caustic soda solution of 35° Bé. and heated until the naphtholate is formed. After this 62.5 kg. paste of the nitrosamin-alkali-metal-salt of meta-nitro-para-toluidin (corresponding 15% of base and containing 3% of free caustic soda) are stirred in on a ball-mill. The yield is 100 kg. paste.

Example II: 25 kg. 2.3-oxynaphthoic-acid-anilid and 12.5 kg. caustic soda in lumps are well powdered and then in a ball-mill ground with 50 kg. of well pressed paste of the nitrosamin-alkali-metal-salt of meta-nitro-para-toluidin (corresponding 30% of base and containing 6% of free caustic soda). Then the product is dried in flat pans at moderate temperature and ground to a fine powder. The yield is 75 kg. of a yellow powder which dissolves totally in water.

Example III: 15 kg. 2.3-oxynaphthoic-acid-anilid are well ground with 26 kg. caustic soda solution of 35° Bé. and heated until the naphtholate is formed. Then in a ball-mill 58 kg. paste of the nitrosamin-alkali-metal-salt of para-nitranilin (corresponding 14% of base and containing 1% of free caustic soda) are stirred in. Yield: 99 kg. paste.

Example IV: 11.5 kg. 2.3-oxynaphthoic-acid-nitroanilid are well ground with 26 kg. caustic soda solution of 35° Bé. and heated until the naphtholate is formed. Then in a ball-mill 38 kg. paste of the nitrosamin-alkali-metal-salt of para-nitro-ortho-anisidin (corresponding 16.8% of base and containing 2% of free caustic soda) are stirred in. Yield: 75.5 kg. paste.

Example V: 31 kg. beta-naphthol are well ground with 33 kg. caustic soda solution of 35° Bé. and heated until the naphtholate is formed. After this in ball-mill 125 kg. paste of the nitrosamin-alkali-metal-salt of meta-nitro-para-toluidin (corresponding 30% of base and containing 6% of free caustic soda) are stirred in. Yield: 189 kg. paste.

Now what I claim and desire to secure by Letters Patent is the following:

Compounds, for use in the production of dyestuffs, consisting of mixtures of nitrosamin-alkali-metal-salts and alkali metal salts of the 2.3-oxynaphthoic-acid-arylamids.

That I claim the foregoing as my invention, I have signed my name in presence of two witnesses, this thirtieth day of March, 1915.

FELIX KUNERT.

Witnesses:
   FRITZ DÉSOR,
   HEI SCHWEICKHART.